US008342273B2

(12) United States Patent
Takahashi

(10) Patent No.: US 8,342,273 B2
(45) Date of Patent: Jan. 1, 2013

(54) CONTROL APPARATUS FOR VEHICLE DRIVE SYSTEM

(75) Inventor: Shigenori Takahashi, Anjo (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 317 days.

(21) Appl. No.: 12/778,451

(22) Filed: May 12, 2010

(65) Prior Publication Data

US 2010/0292881 A1  Nov. 18, 2010

(30) Foreign Application Priority Data

May 14, 2009 (JP) .................................. 2009-117254

(51) Int. Cl.
*G06F 19/00* (2006.01)

(52) U.S. Cl. ............ 180/65.28; 180/65.275; 180/65.285; 701/22; 701/29.2

(58) Field of Classification Search ..................... 701/22, 701/29.2; 180/65.275, 65.285, 65.28
See application file for complete search history.

(56) References Cited

U.S. PATENT DOCUMENTS

| 6,135,914 A * | 10/2000 | Yamaguchi et al. ............... 477/3 |
| 6,329,772 B1 * | 12/2001 | Ochiai et al. ................. 318/139 |
| 6,488,107 B1 * | 12/2002 | Ochiai et al. ............... 180/65.25 |
| 6,512,967 B2 * | 1/2003 | Ostberg et al. .................. 701/22 |
| 7,109,605 B2 * | 9/2006 | Habu .............................. 307/39 |
| 7,189,177 B2 * | 3/2007 | Takasu et al. ...................... 475/5 |
| 7,934,485 B2 * | 5/2011 | Ota et al. ....................... 123/350 |
| 8,040,081 B2 * | 10/2011 | Shimana ......................... 318/34 |
| 2001/0048226 A1 | 12/2001 | Nada |
| 2007/0093359 A1 * | 4/2007 | Kobayashi et al. ........... 477/107 |
| 2009/0192663 A1 * | 7/2009 | Bennewitz ....................... 701/29 |
| 2009/0255744 A1 * | 10/2009 | Kitano ..................... 180/65.285 |
| 2010/0121512 A1 * | 5/2010 | Takahashi et al. .............. 701/22 |
| 2011/0074333 A1 * | 3/2011 | Suzuki .......................... 318/724 |
| 2011/0125356 A1 * | 5/2011 | Takahashi ....................... 701/22 |
| 2011/0276213 A1 * | 11/2011 | Tomatsuri ....................... 701/22 |

FOREIGN PATENT DOCUMENTS

WO  WO 2009001468 A1 * 12/2008
WO  WO 2009008501 A1 *  1/2009

* cited by examiner

*Primary Examiner* — Joseph Rocca
*Assistant Examiner* — James English
(74) *Attorney, Agent, or Firm* — Nixon & Vanderhye P.C.

(57) ABSTRACT

Over rotation limitation control is performed to control an engine rotation speed so that a rotation speed of a pinion gear of a planetary gear set will not exceed a limit value, when a travel mode is changed to a limp-home travel mode in response to an abnormality in an inverter for a first motor generator. With this over rotation limitation control, a difference between rotation speeds of a ring gear coupled to a wheel side and a carrier coupled to an engine side. Thus, when the limp-home travel mode is performed due to the abnormality in the inverter for the first motor generator, a secondary failure, in which the pinion gear burns out and the planetary gear set fails, is prevented.

9 Claims, 11 Drawing Sheets

CONTROL APPARATUS FOR VEHICLE DRIVE SYSTEM

CROSS REFERENCE TO RELATED APPLICATION

This application is based on and incorporates herein by reference Japanese Patent Application No. 2009-117254 filed on May 14, 2009.

FIELD OF THE INVENTION

The present invention relates to a control apparatus for a vehicle drive system, in which an internal combustion engine, a first motor generator and a wheel drive shaft are coupled through a planetary gear set and a second motor generator is coupled to the wheel drive shaft.

BACKGROUND OF THE INVENTION

Hybrid vehicles are demanded more and more recently from the standpoint of social demands such as low fuel consumption and low exhaust emission. In hybrid vehicles, which are presently available in the market, as disclosed in JP 2001-329884A, an internal combustion engine, a first motor generator (MG) used primarily as a generator and a second motor generator (MG) used primarily to drive wheels are provided. The crankshaft of the internal combustion engine is coupled to a planet carrier of a pinion gear of a planetary gear set, which is a power distribution mechanism. The first MG is coupled to a sun gear of the planetary gear set. A wheel drive shaft and the second MG are coupled to a ring gear of the planetary gear set.

According to this type of hybrid vehicle, a fail-safe operation is performed when a predetermined abnormality (for example, abnormality in an engine system or abnormality in a first MG system) arises. As the fail-safe operation, the vehicle is driven by only drive power of the second MG while stopping the operations of the engine and the first MG. Thus, the operation mode of the vehicle is changed to a limp-home travel mode, which is a fail-safe mode or a motor drive mode.

However, if the operation of the engine is stopped immediately at the time of changing the vehicle operation mode to the limp-home travel mode in response to occurrence of abnormality in the engine system or the first MG system while traveling at high speeds, the engine rotation speed falls and the engine stops while the travel speed of the vehicle is still relatively high. In this case, the difference between the rotation speed of the ring gear coupled to the wheel side and the rotation speed of the carrier coupled to the engine side becomes large in the planetary gear set. The pinion gear rotation speed is likely to exceed an allowable maximum limit value. If the pinion gear rotation speed exceeds the allowable maximum limit value, the pinion gear will be burned out and the planetary gear set will fail and become inoperative. This will result in a secondary failure.

If the pinion gear rotation speed exceeds the allowable maximum limit value and the planetary gear set fails causing the secondary failure when the vehicle operation mode is changed to the limp-home travel mode due to abnormality in the first MG system (for example, first MG, inverter for first MG or the like), not only the first MG system (for example, first MG or inverter for first MG), which is the original cause for the abnormality, but also the planetary gear set need be replaced with new system and new set in a repair work. As a result, repair cost will greatly increase.

To meet requirements for reduction of the number of component parts (reduction of assembling work), downsizing and low cost, drive power transfer system parts such as the first MG and the planetary gear set are integrated into a single transfer assembly unit and mounted in a vehicle. If the pinion gear rotation speed exceeds the allowable maximum limit value and the planetary gear set fails causing the secondary failure when the vehicle operation mode is changed to the limp-home travel mode due to abnormality in the inverter of the first MG in the first MG system, not only the inverter of the first MG system, which is the original cause for the abnormality, but also the transfer assembly unit (the first MG, the planetary gear set and the like) need be replaced with new ones in a repair work. As a result, repair cost will greatly increase.

SUMMARY OF THE INVENTION

It is therefore an object of the present invention to provide a control apparatus for a vehicle drive system, which can restrict a secondary failure, which is a failure of a planetary gear set, from occurring in case of a change in a vehicle operation mode to a limp-home travel mode.

According to the first aspect, a control apparatus provided for a vehicle drive system, in which an internal combustion engine, a first motor generator and a wheel drive shaft are coupled via a planetary gear set and a second motor generator is coupled to the wheel drive shaft, includes a limp-home travel control section and an over rotation limitation control section. The limp-home travel control section is configured to change a vehicle operation mode to a limp-home travel mode, in which a vehicle is driven by only drive power of the second motor generator, when a predetermined abnormality occurs. The over rotation limitation control section is configured to perform, when the vehicle operation mode is changed to the limp-home travel mode due to occurrence of abnormality in a system of the first motor generator, an over rotation limitation control to control a rotation speed of the internal combustion engine so that a rotation speed of a pinion gear of the planetary gear set is limited to be lower than a predetermined limit value.

According to the second aspect, a control apparatus provide for a vehicle drive system, in which an internal combustion engine, a first motor generator and a wheel drive shaft are coupled via a planetary gear set and a second motor generator is coupled to the wheel drive shaft, includes a limp-home travel control section and an over rotation limitation control section. The limp-home travel control section is configured to change a vehicle operation mode to a limp-home travel mode, in which a vehicle is driven by drive power of the second motor generator, when a predetermined abnormality occurs. The over rotation limitation control section is configured to perform, when the vehicle operation mode is changed to the limp-home travel mode, an over rotation limitation control to lower a travel speed of the vehicle so that a rotation speed of a pinion gear of the planetary gear set is limited to be lower than a predetermined limit value.

BRIEF DESCRIPTION OF THE DRAWINGS

The above and other objects, features and advantages of the present invention will become more apparent from the following description made with reference to the accompanying drawings. In the drawings.

DETAILED DESCRIPTION OF THE PREFERRED EMBODIMENT

The present invention will be described below with reference to embodiments, which implement the present invention.

(First Embodiment)

The first embodiment is shown in FIGS. 1 to 8A and 8B.

Figure 1:
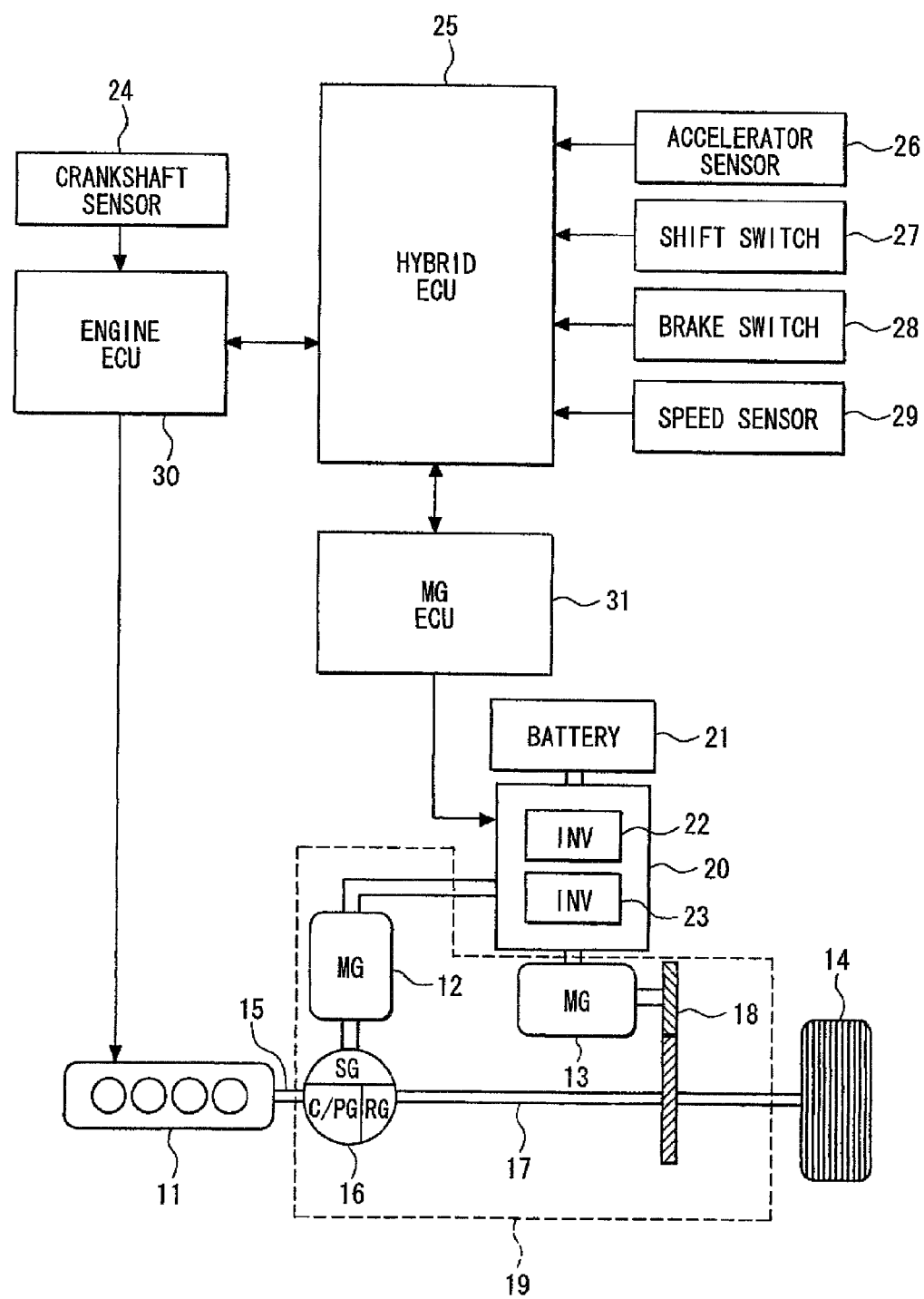
FIG. 1 is a schematic diagram showing a drive system for a hybrid vehicle according to a first embodiment of the present invention.

Referring first to FIG. 1, in which an entire drive system of a hybrid vehicle is shown, an internal combustion engine 11, a first motor generator (MG) 12 and a second motor generator (MG) 13 are mounted in a hybrid vehicle. The engine 11 and the second MG 13 are used as a drive power source for driving wheels 14. The drive power of a crankshaft 15 of the engine 11 is distributed to two systems by a planetary gear set 16, which is a drive power distribution mechanism.

The planetary gear set 16 includes a sun gear SG, a pinion gear PG and a ring gear RG. The crankshaft 15 of the engine 11 is coupled to the pinion gear PG via a planet carrier C. A rotation shaft of the first MG 12, which is primarily used as an electric power generator 12, is coupled to the sun gear SG.

A propeller shaft (drive shaft) 17 is coupled to the ring gear RG. The drive power of the propeller shaft 17 is transferred to the wheels 14 via a differential gear (not shown) and axles (not shown). A rotation shaft of the second MG 13 is coupled to the propeller shaft 17 via a reduction gear set 18. The drive power transfer system parts such as the first MG 12, the second MG 13, the planetary gear set 16, the propeller shaft 17 and the reduction gear set 18 are integrated as a single transfer assembly unit 19 and mounted in the vehicle.

The first MG 12 and the second MG 13 are connected to a battery 21 via an electronic power control unit 20. The power control unit 20 includes a first inverter 22 for driving the first MG 12 and a second inverter 23 for driving the second MG 13. The MGs 12 and 13 are configured to be capable of supply and receive electric power to and from the battery 21. A crankshaft angle sensor 24 is attached to the engine 11 and generates a pulse signal each time the crankshaft 15 rotates a predetermined crankshaft angular interval. A crankshaft angle and an engine rotation speed are detected based on the output signal of the crankshaft angle sensor 24.

A hybrid electronic control unit (ECU) 25 is a computer provided to control the hybrid vehicle comprehensively. The hybrid ECU 25 acquires output signals of various sensors and switches and detects vehicle operation conditions. The sensors and switches include an accelerator position sensor 26 for detecting an accelerator position, a shift switch 27 for detecting a shift lever position, a brake switch 28 for detecting a brake operation, a vehicle speed sensor 29 for detecting a vehicle travel speed and the like. The hybrid ECU 25 is configured to transmit and receive control signals and data signals to and from an engine ECU 30 and a MG ECU 31. The engine ECU 30 is configured to control operations of the engine 11. The MG ECU 31 is configured to control operations of the first MG 12 and the second MG 13 by controlling the first inverter 22 and the second inverter 23, respectively. The hybrid ECU 25 thus controls the operations of the engine 11, the first MG 12 and the second MG 13 by the ECUs 30 and 31.

For example, in a vehicle travel start time or a low load time (fuel efficiency of the engine 11 is low), the second MG 13 is driven with the electric power of the battery 21 with the engine 11 being maintained in the stop condition. Thus, a motor travel is performed by driving the wheels 14 by only the drive power of the second MG 13.

In starting the engine 11, the first MG 12 is driven with the electric power of the battery 21 and the drive power of the first MG 12 is transferred to the crankshaft 15 of the engine 11. Thus, the engine 11 is started by driving the crankshaft 15 to rotate.

In normal travel time, for maximizing fuel efficiency, the drive power of the crankshaft 15 of the engine 11 is divided into two systems, that is, the first MG 12 side and the propeller shaft 17, by the planetary gear set 16. The drive power of one system is used to drive the propeller shaft 17 for driving the wheels 14 and the drive power of the other system is used to drive the first MG 12 for generating electric power by the first MG 12. The electric power thus generated is used to drive the second MG 13 so that the wheels 14 are also driven by the drive power of the second MG 13. In rapid acceleration time, the electric power of the battery 21 in addition to the electric power generated by the first MG 12 is supplied to the second MG 13 so that the drive power of the second MG 13 is increased for vehicle acceleration.

In deceleration or braking time, the motive power of the wheels 14 is used to drive the second MG 13 so that the second MG 13 operates as the generator. The kinetic energy of the vehicle is thus converted by the second MG 13 into electric power, which is restored to the battery 21.

Figure 2:
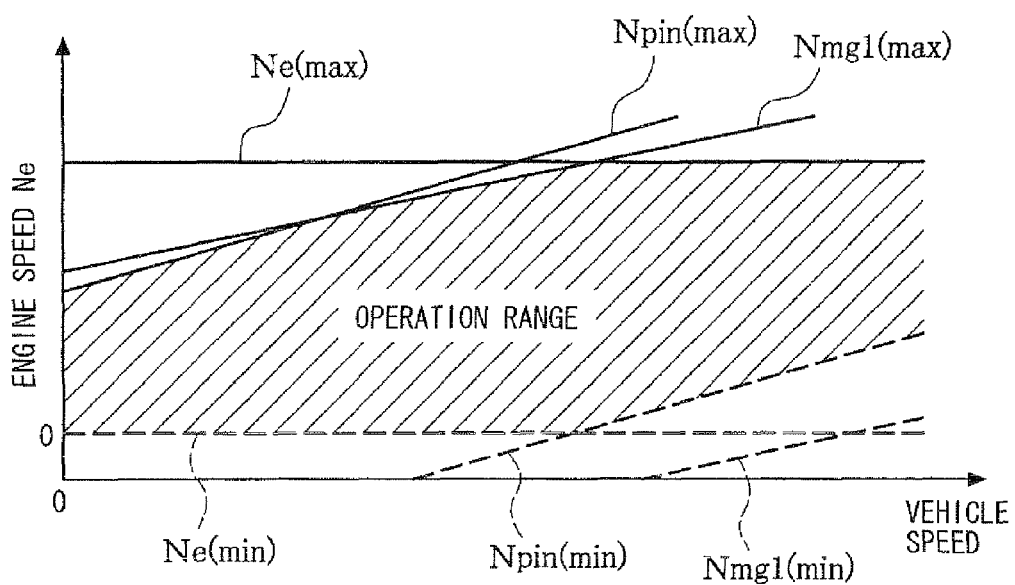
FIG. 2 is a graph showing a drive limitation region.

In thus controlling vehicle travel operations, the hybrid ECU 25 controls the operations of the engine 11, the first MG 12 and the second MG 13 so that the vehicle speed and the engine rotation speed are limited in a predetermined operation range shown in FIG. 2. The predetermined operation range is defined as a range, in which all of the following three conditions (1) to (3) are satisfied:

(1) the engine rotation speed Ne is between an allowable minimum limit value Ne(min) and an allowable maximum limit value Ne(max);

(2) the rotation speed Nmg1 of the first MG 12 is between an allowable minimum limit value Nmg1(min) and an allowable maximum limit value Nmg1(max); and (3) the rotation speed Npin of the pinion gear PG of the planetary gear set 16 is between an allowable minimum limit value Npin(min) and an allowable maximum limit value Npin(max).

Figure 5:
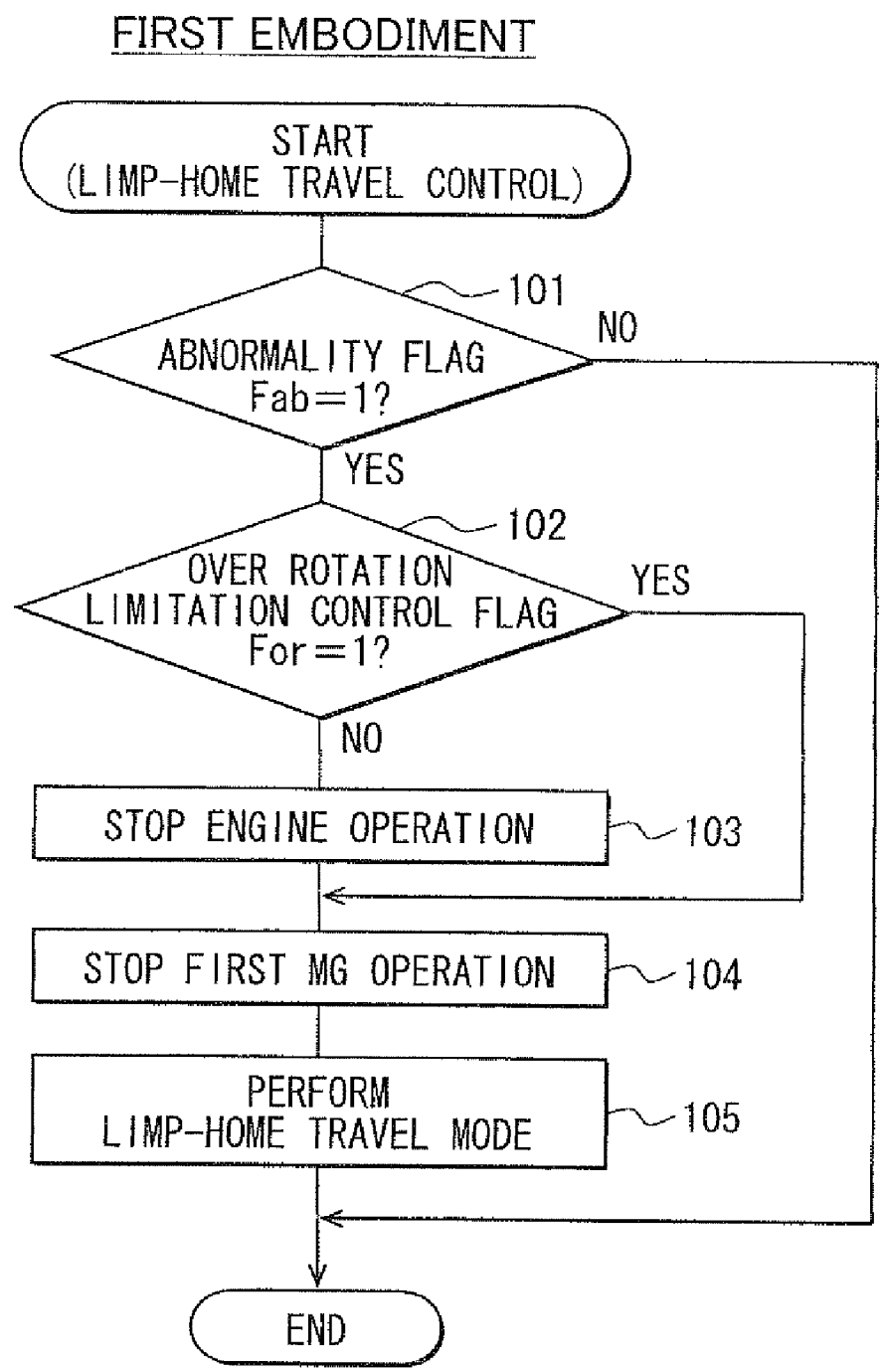
FIG. 5 is a flowchart showing processing of a limp-home travel control routine executed in the first embodiment.

The hybrid ECU 25 is configured to execute a limp-home travel control routine shown in FIG. 5. Specifically, when an abnormality arises in the engine 11 system (for example, fuel system, air system or ignition system) or in the first MG 12 system (for example, first MG 12 or first inverter 22), a vehicle operation mode (travel mode) is changed to a limp-home travel mode (fail-safe mode or motor travel mode) as a fail-safe operation. In this mode, not only the operation of the engine 11 but also the operation of the first MG 12 are stopped, and only the second MG 13 is operated to drive the vehicle.

Figure 3:
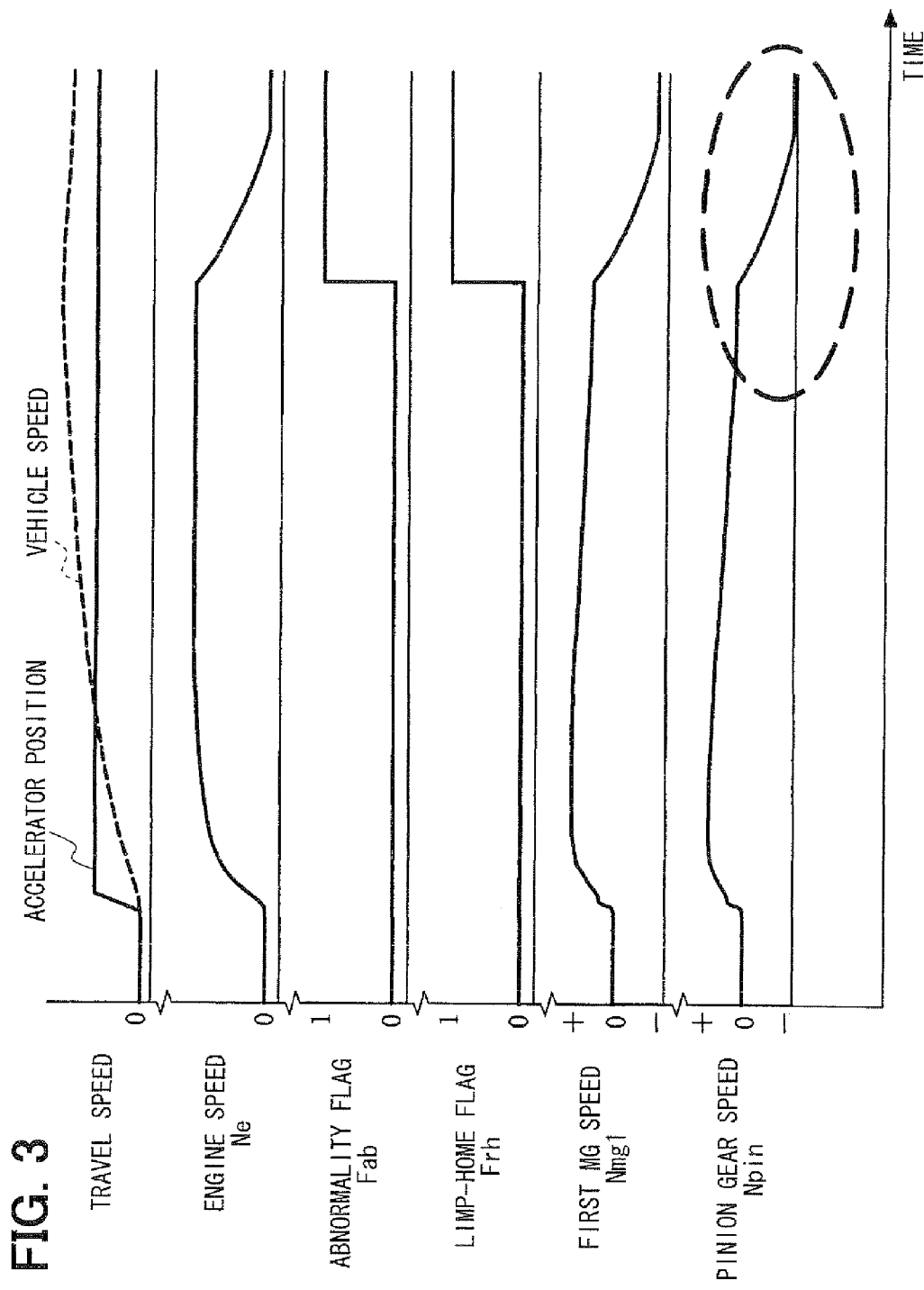
FIG. 3 is a time chart showing changes in a rotation speed of a pinion gear and the like in case that an engine operation is stopped immediately at the time of changing to a limp-home travel mode.
Figure 4A:
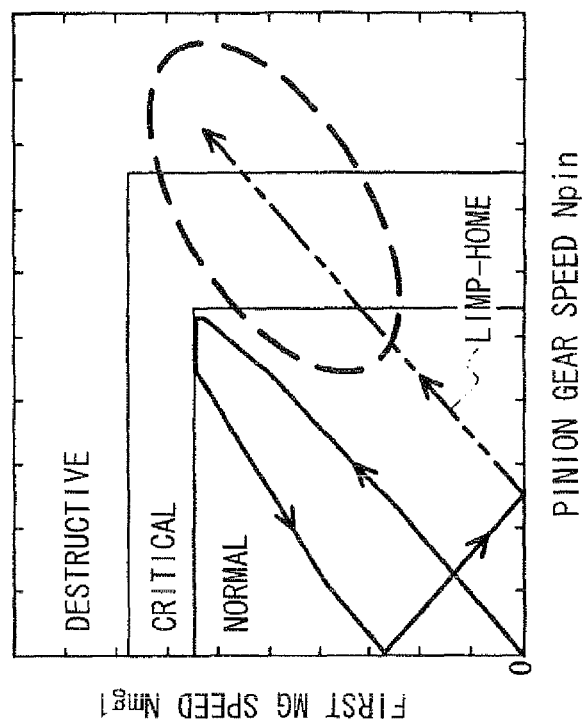
FIGS. 4A and 4B are graphs showing adversary effects caused when the engine operation is stopped immediately at the time of changing to the limp-home travel mode.
Figure 4B:
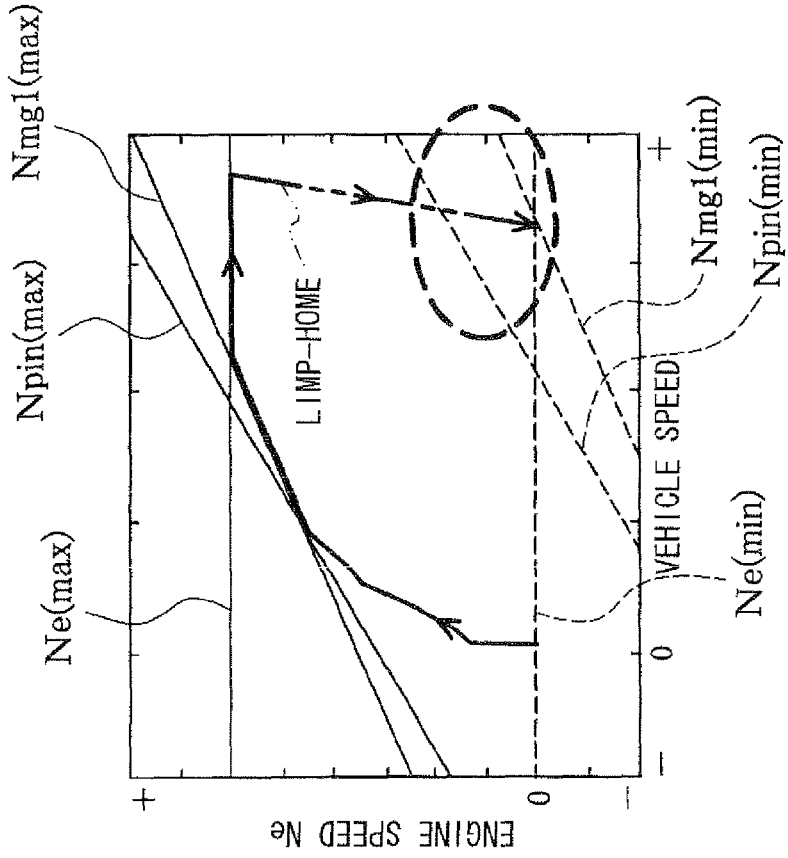

However, if the operation of the engine 11 is stopped immediately when the vehicle operation mode is changed to the limp-home travel mode in response to the abnormality arising in the engine 11 system or the first MG 12 system during a high vehicle speed travel, the engine rotation speed Ne falls and the engine rotation stops under the high vehicle speed condition. The difference between the rotation speed of the ring gear RG coupled to the wheel 14 side and the rotation speed of the carrier C coupled to the engine 11 side becomes great and hence the rotation speed Npin (absolute value) of the pinion gear PG rises. In FIG. 3, the rotation speeds of the pinion gear PG in the forward direction and the reverse direction are indicated as a positive value and a negative value, respectively. As a result, the rotation speed Npin of the pinion gear PG is likely to exceed a predetermined limit value (for example, allowable minimum value Npin(min) as shown in FIG. 4A. Further, it is likely that, the pinion gear PG will be burned out and the planetary gear set 16 will fail resulting in a secondary failure, if the rotation speed Npin of the pinion gear PG exceeds the limit value and enters a critical range or destructive range as shown in FIG. 4B.

According to the first embodiment, the drive power transfer system parts such as the MG unit 12 and the planetary gear set 16 are integrated into a single unit as the transfer assembly unit 19. When the vehicle operation mode is changed to the limp-home travel mode in response to occurrence of abnormality in the first inverter 22 (inverter for the first MG 12), the pinion gear rotation speed may exceed its limit value and cause the secondary failure, which includes the failure of the planetary gear set 16. In this case, it becomes necessary in repair work to replace not only the first inverter 12, which is the original cause of the failure, but also the transfer assembly unit 19 (first MG 12, planetary gear set 16 and the like). This results in remarkable increase in the repair cost.

To counter this problem, according to the first embodiment, the hybrid ECU 25 (and/or engine ECU 30) is configured to execute an over rotation limitation control routine shown in FIG. 6 as described below. By this over rotation limitation control, the engine rotation speed is controlled so that the pinion gear rotation speed does not exceed the predetermined limit value when the vehicle speed is higher than a predetermined value at the time of change to the limp-home travel mode in response to occurrence of abnormality in the first inverter 22.

When the vehicle operation mode is changed to the limp-home travel mode in response to occurrence of abnormality in the engine 11 system (for example, fuel system, air system or ignition system), it may be impossible to properly control the engine rotation speed. When the vehicle operation mode is changed to the limp-home travel mode in response to occurrence of abnormality in the first MG 12 system (for example, first MG 12 or first inverter 22), it is however possible to control the engine rotation speed.

Further, the rotation speed of the carrier C coupled to the engine 11 side can be controllable by controlling the engine rotation speed. Thus, by controlling the difference between the rotation speed of the ring gear RG coupled to the wheel 14 side and the rotation speed of the carrier C coupled to engine 11 side, the pinion gear rotation speed can be controlled.

According to the first embodiment, therefore, when the vehicle operation mode is changed to the limp-home travel mode due to occurrence of abnormality in the first inverter 22, the over rotation limitation control is executed to limit the engine rotation speed so that the pinion gear rotation speed does not exceed the limit value. As a result, the difference between the rotation speeds of the ring gear RG coupled to the wheel 14 side and the carrier C coupled to the engine 11 side is limited within an allowable range and the pinion gear rotation speed is maintained not to exceed the limit value.

The limp-home travel control routine shown in FIG. 5 and the over rotation limitation control routine shown in FIG. 6, which the hybrid ECU 25 (and/or engine ECU 30) executes, is described in detail below.

Limp-Home Travel Control Routine:

The limp-home travel control routine shown in FIG. 5 is executed repetitively at a predetermined time interval during a power-on period by the hybrid ECU 25 (and/or engine ECU 30). This routine operates as a limp-home travel control section or function.

When this routine starts, it is first checked at step 101 whether an abnormality flag Fab of the engine 11 system (for example, abnormality flag of fuel system, abnormality flag of air system, or abnormality flag of ignition system) or the first MG 12 system (for example, abnormality flag of first MG 12, abnormality flag of first inverter 22) is set to "1" indicating presence of abnormality. These abnormality flags may be set in an abnormality diagnosis routine, although not shown.

If it is determined at step 101 that all the abnormality flags of the engine 11 system and the first MG 12 system are set to "0," both the engine 11 system and the first MG 12 system are determined to be normal. In this case, this routine ends without executing step 102 and subsequent steps.

If it is determined at step 101 that at least one of the abnormality flags of the engine 11 system and the first MG 12 system is set to "1," the engine system 11 or the first MG 12 system has abnormality. In this case, it is checked at step 102 whether an over rotation limitation control flag For is set to "1" indicating that the over rotation limitation control should be performed. This over rotation limitation flag is set by the over rotation limitation control routine shown in FIG. 6.

If it is determined at step 102 that the over rotation control flag For is "0," the over rotation limitation control is determined to be unnecessary. At step 103, the operation of the engine 11 is stopped. At step 104, the operation of the first MG 12 is also stopped. Then at step 105, the limp-home travel mode (motor travel mode) is performed by driving the vehicle with only the drive power of the second MG 13.

If it is determined at step 102 that the over rotation control flag For is set to "1," the processing skips step 103 and proceeds to step 104 by determining that the over rotation limitation control is necessary. At step 104, the operation of the first MG 12 is stopped. At step 105, the limp-home travel mode (motor travel mode) is performed to drive the vehicle with the drive power of the second MG 13.

Figure 6:
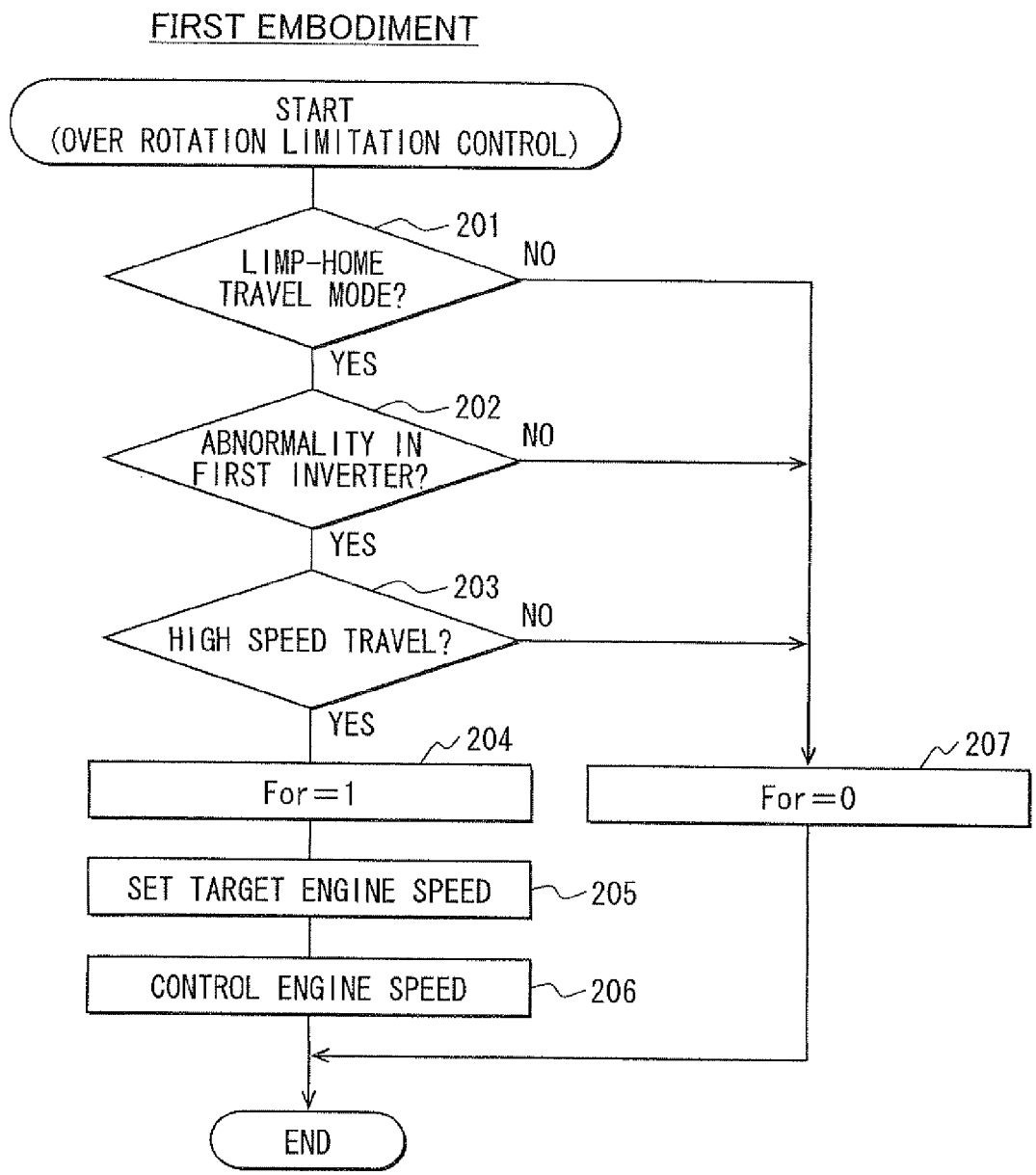
FIG. 6 is a flowchart showing processing of an over rotation limitation control routine executed in the first embodiment.

Over Rotation Limitation Control Routine:

The over rotation limitation control routine shown in FIG. 6 is executed repetitively at a predetermined time interval during the power-on period by the ECU 25 (and/or engine ECU 30). This routine operates as over rotation limitation control section or function.

When this routine starts, first it is checked at step 201 whether the vehicle is in the limp-home travel mode. If it is determined that the vehicle is in the limp-home travel mode, it is checked at step 202 whether the abnormality is in the first inverter 22 (inverter for first MG 12). This may be checked based on whether the abnormality flag of the first inverter 22 is "1."

If it is determined at step 201 that the vehicle is not in the limp-home travel mode or determined at step 202 that the abnormality is not in the first inverter 22, step 207 is executed and the over rotation limitation control flag is set to "0" thus ending this routine.

If it is determined at step 201 that the vehicle is in the limp-home travel mode and determined at step 202 that the abnormality is in the first inverter 22, the processing proceeds to step 203 by determining that the vehicle operation mode has changed to the limp-home travel mode because of the abnormality in the first inverter 22. At step 203, it is checked whether the vehicle is traveling at high speeds, for example, higher than a predetermined speed 100 km/h.

If it is determined at step 203 that the vehicle speed is higher than the predetermined speed, it is determined that stopping the operation of the engine 11 will possibly cause an crease in the difference between the rotation speeds of the ring gear RG coupled to the wheel 14 side and the carrier C coupled to the engine 11. As a result, the pinion gear rotation speed will possibly exceed the limit value. In this case, the processing proceeds to step 204 to set the over rotation limitation control flag to "1" and execute processing related to the over rotation limitation control at steps 205 and 206 as follows.

Figure 7:
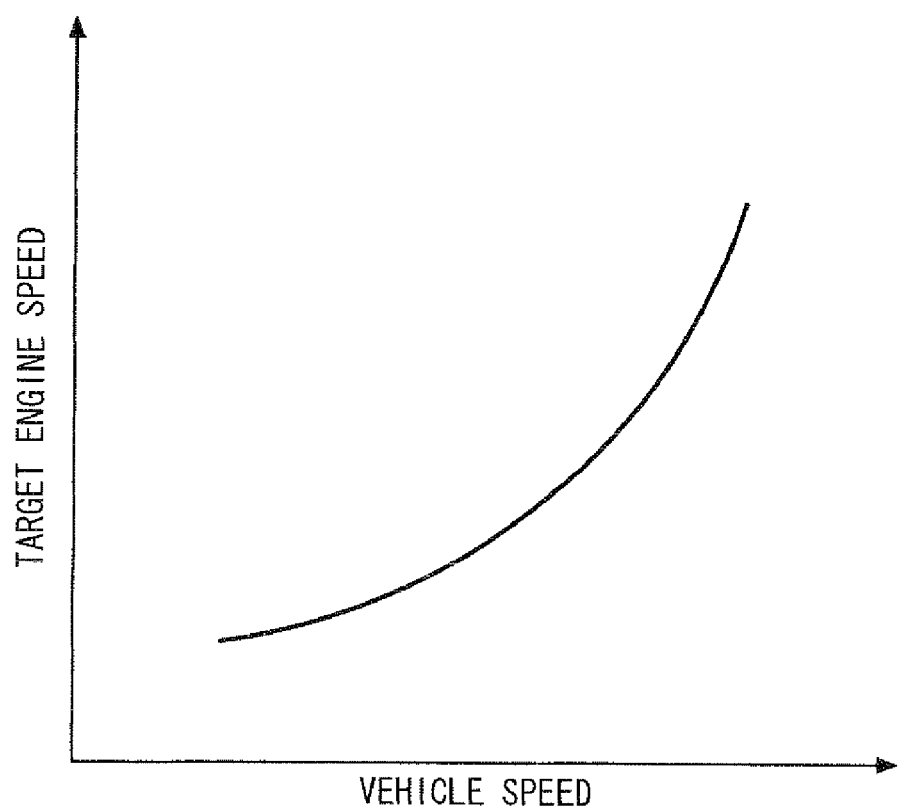
FIG. 7 is a graph showing one example of a data map of a target engine rotation speed.

At step 205, a target engine rotation speed is determined based on the vehicle speed by referring to a data map of a target engine rotation speed shown in FIG. 7. This data map of the target engine rotation speed is set such that the target engine rotation speed decreases as the vehicle speed decreases. Specifically, the target engine rotation speed is decreased, because the engine rotation speed, which can maintain the pinion gear rotation speed to be lower than the limit value, decreases as the vehicle speed decreases. The map of the target engine rotation speed may be generated based on experimental data, design data or the like and may be stored in a ROM of the hybrid ECU 25 (or engine ECU 30).

At next step 206, a throttle position (angle of a throttle valve) of an electronic throttle device provided in an intake duct of the engine 11 is feedback-controlled by way of control or P-I-D control so that an actual engine rotation speed detected by the crankshaft angle sensor 24 attains the target engine rotation speed.

By these steps 205 and 206, the difference between the rotation speeds of the ring gear RG coupled to the wheel 14 side and the carrier C coupled to the engine 11 side is maintained within an allowable range. Thus, the over rotation limitation control, which controls the engine rotation speed, is performed so that the pinion gear rotation speed is maintained to be lower than the limit value.

If it is determined at step 203, on the other hand, that the vehicle speed is lower than the predetermined speed, the difference between the rotation speeds of the ring gear RG coupled to the wheel 14 side and the carrier C coupled to the engine 11 side does not increase so much and the pinion gear rotation speed will not exceed the limit value. In this case, the over rotation limitation control flag is reset to "0" at step 207 thus ending this routine without executing the processing for the over rotation limitation control of the steps 205 and 206.

Figure 8A:
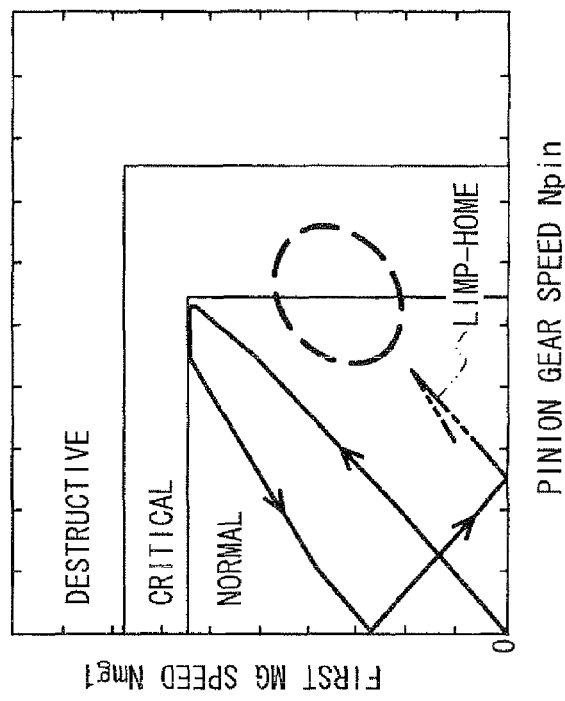
FIGS. 8A and 8B are graphs showing advantageous effects of the first embodiment.

According to the first embodiment, when the vehicle operation mode is changed to the limp-home travel mode in response to the occurrence of abnormality in the first inverter 22, the over rotation limitation control is performed to control the engine rotation speed Ne such that the rotation speed Npin of the pinion gear PG does not exceed the limit value as shown in FIG. 8A. As a result, the difference between the rotation speeds of the ring gear RG coupled to the wheel 14 side and the carrier C coupled to the engine 11 side can be limited to be within the allowable range and the rotation speed Npin of the pinion gear PG can be maintained to be lower than the limit value.

Figure 8B:
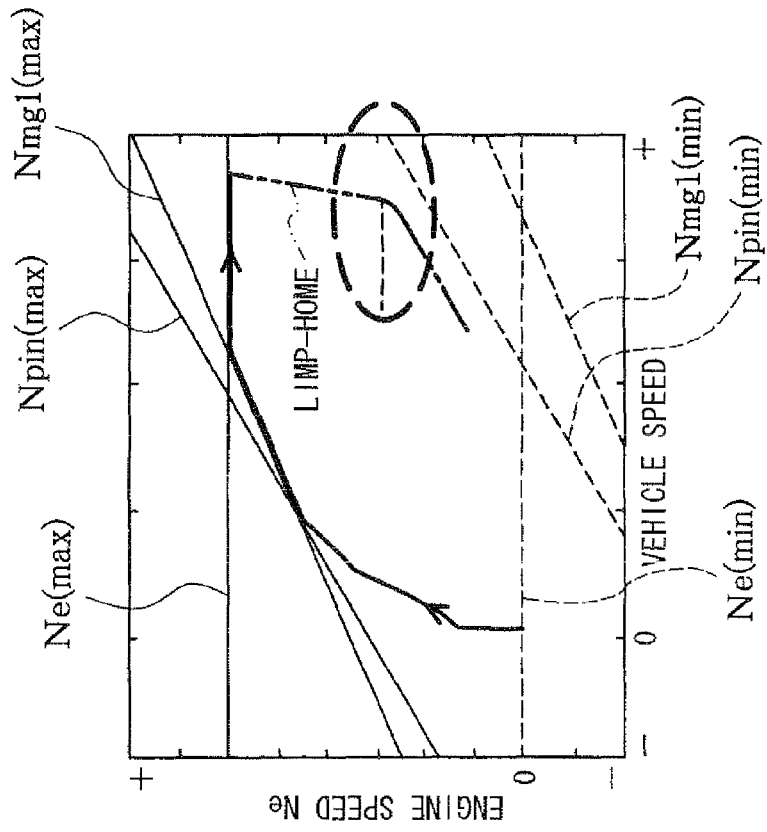

Thus, as shown in FIG. 8B, when the vehicle operation mode is changed to the limp-home travel mode in response to the occurrence of abnormality in the first inverter 22, it can be prevented that the rotation speed Npin of the pinion gear PG will exceed the limit value and enter the critical range or the destructive range. The secondary failure, in which the pinion gear PG burns out and the planetary gear set 16 fails, is prevented from occurring. As a result, it is only necessary in the repair work to replace the first inverter 22, which has the root cause and not necessary to replace the transfer assembly unit 19. Thus the disadvantage, which the user may suffer, will be reduced by suppression of repair costs.

According to the first embodiment, further, the target engine rotation speed is set in accordance with the vehicle travel speed in performing the over rotation limitation control. As a result, the target engine rotation speed can be controlled to vary in correspondence to changes in the engine rotation speed, which can maintain the pinion gear rotation speed to be lower than the limit value. Thus, while maintaining the pinion gear rotation speed to be lower than the limit value, it can be prevented that the engine rotation speed will rise unnecessarily high.

It is possible to reduce calculation processing of the hybrid ECU 25 by fixing the target engine rotation speed [engine rotation speed (for example 3,000 rpm) which can maintain the pinion gear rotation speed to be lower than the limit value in any vehicle travel speed range] as shown by a dotted line in FIG. 8A in performing the over rotation limitation control.

In the first embodiment, when the vehicle operation mode is changed to the limp-home travel mode in response to the abnormality in the first inverter 22, the over rotation limitation control is performed to control the engine rotation speed so that the pinion gear rotation speed does not exceed the limit value. However, in case of a system in which the first MG 12 and the planetary gear set 16 are replaceable with new ones separately, it is also possible to perform the over rotation limitation control, which controls the engine rotation speed so that the pinion gear rotation speed will not exceed the limit value when the vehicle operation mode is changed to the limp-home travel mode in response to the abnormality in the first MG 12 system (for example, first MG 12 or first inverter 22).

Thus, when the vehicle operation mode is changed to the limp-home travel mode in response to the occurrence of abnormality in the first MG 12 system, it can be prevented that the secondary failure, in which the pinion gear PG burns out and the planetary gear set 16 fails, is prevented from occurring. As a result, it is only necessary in the repair work to replace the first MG 12 system (for example, first MG 12 or first inverter 22) which has the original or root cause and not necessary to replace the planetary gear set 16. Thus the disadvantage, which the user may suffer, will be reduced by suppression of repair costs.

(Second Embodiment)

The second embodiment of the present invention will be described in detail with reference to FIGS. 9 to 11. The description is limited to parts different from the first embodiment, while being omitted or simplified with respect to substantially the same parts as in the first embodiment. According to the second embodiment, based on that the rotation speed of the ring gear RG coupled to the wheel 14 side can be lowered by lowering the vehicle travel speed, the hybrid ECU 25 is configured to execute control routines shown in FIGS. 9 and 10. Specifically, when the vehicle operation mode is changed to the limp-home travel mode due to abnormality in the first inverter 22, over rotation limitation control is performed to lower the vehicle travel speed so that the pinion gear rotation speed does not exceed the limit value. Thus, even if the engine rotation speed falls, the difference between the rotation speeds of the ring gear RG coupled to the wheel 14 side and the carrier C coupled to the engine 11 side is maintained within the allowable range.

Figure 9:
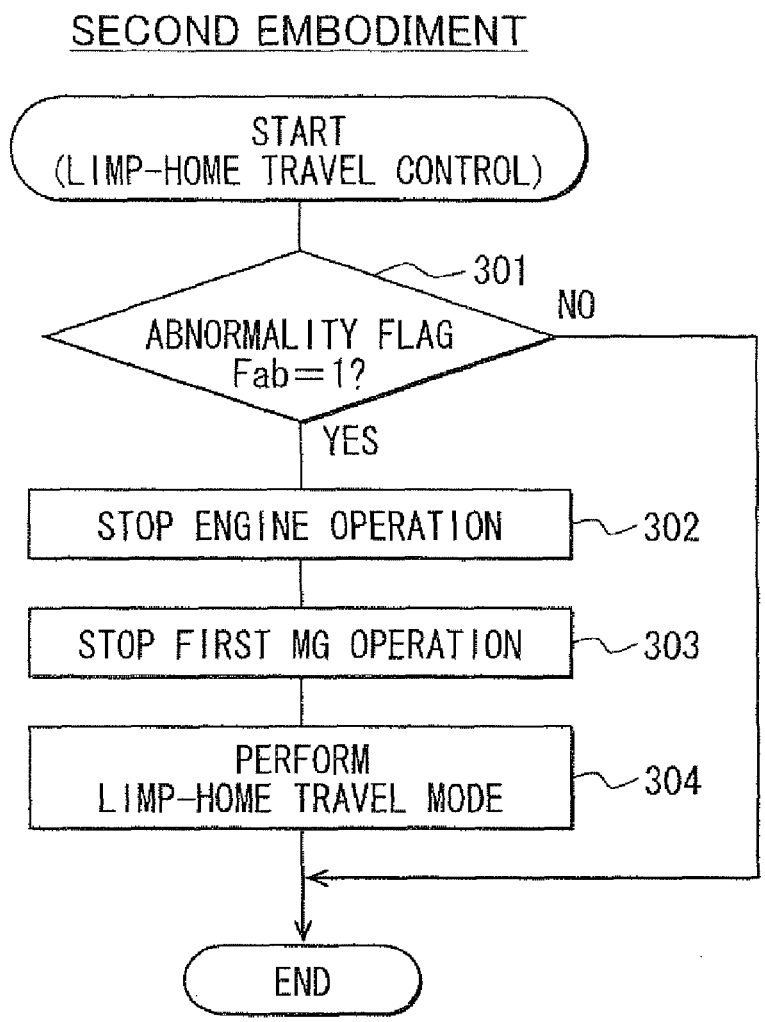
FIG. 9 is a flowchart showing processing of a limp-home travel control routine executed in a second embodiment.

In the limp-home travel control routine shown in FIG. 9, it is checked first at step 301 whether the abnormality flag Fab of the engine 11 system or the abnormality flag Fab of the first MG 12 system is set to "1." If it is determined that at least one of the abnormality flags of the engine 11 system and the first MG 12 system, the engine 11 system or the first MG 12 system is determined to be abnormal. In this case, the operation of the engine 11 is stopped at step 302, and the operation of the first MG 12 is stopped at step 303. Then, at step 304, the vehicle operation mode is changed to the limp-home travel mode (motor travel mode) at step 304 so that the vehicle is driven by the drive power of the second MG 13.

Figure 10:
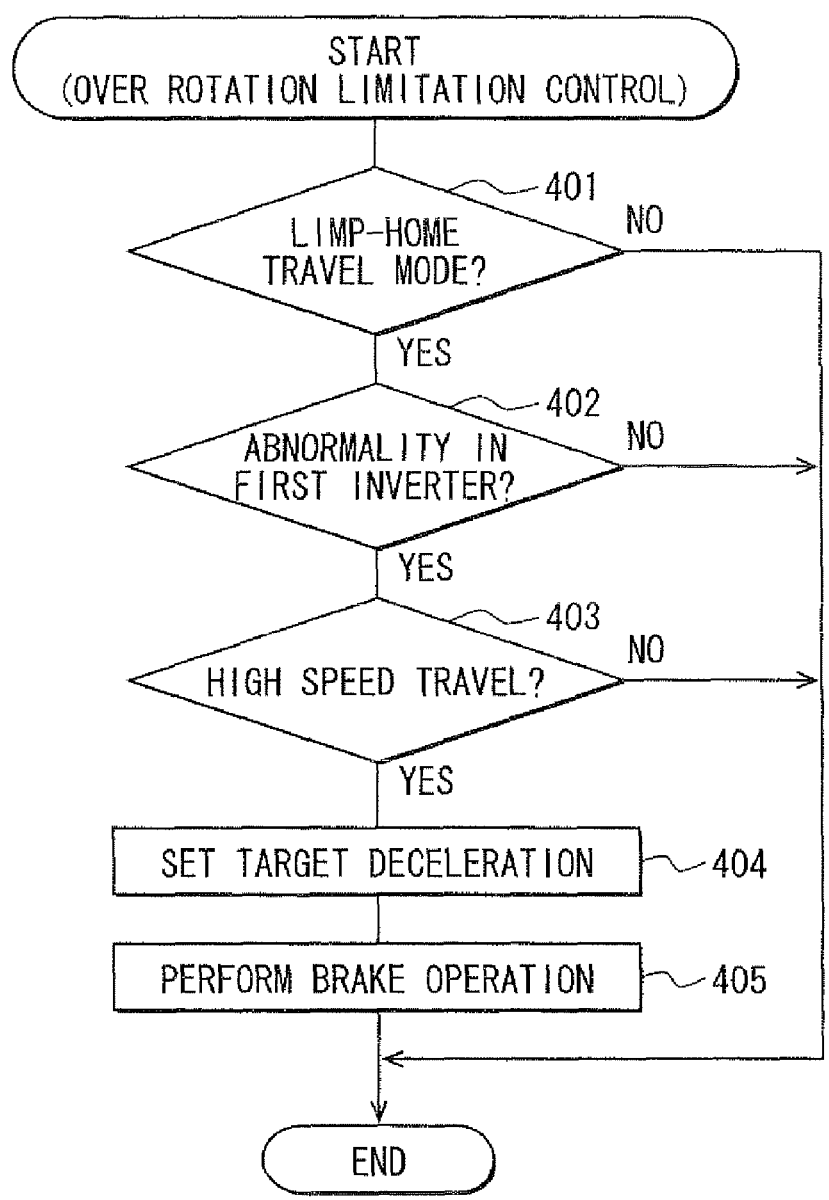
FIG. 10 is a flowchart showing processing of an over rotation limitation control routine executed in the second embodiment.

In the over rotation limitation control routine shown in FIG. 10, it is first checked at step 401 whether the vehicle is in the limp-home travel mode. If it is determined that the vehicle is in the limp-home travel mode, step 402 is executed to check whether the abnormality is in the first inverter 22 (inverter for first MG 12) based on whether the abnormality flag of the first inverter 22 is set to "1."

If it is determined at steps 401 and 402 that the vehicle is in the limp-home travel mode and the first inverter 22 has abnormality, it is determined that the limp-home travel mode is performed due to the abnormality in the first inverter 22. In this case, it is further checked at step 403 whether the vehicle travel speed is higher than the predetermined speed (for example, 100 km/h).

If it is determined at step 403 that the vehicle travel speed is higher than the predetermined speed, the pinion gear rotation speed is determined to be likely to exceed the limit value. In this case, the over rotation limitation control is performed as follows at steps 404 and 405.

At step 404, a target deceleration is determined with reference to a data map (not shown) of a target deceleration. This data map is set such that, for example, the target deceleration increases as the vehicle travel speed increases. The target deceleration may be fixed to a predetermined value (by which the pinion gear rotation speed can be maintained to be lower than the limit value over an entire travel speed range).

Then, at step 405, a hydraulic brake device (not shown) provided in the vehicle is actuated to attain the target deceleration. At the same time, the kinetic energy of the vehicle is converted to electric power by the second MG 13 to be restored to the battery 21. By this regenerative braking operation, the vehicle travel speed is lowered. In this case, it is possible to effect the regenerative braking with priority and increase the amount of electric power restoration (battery charging amount). The hydraulic brake device may be actuated to assist the regenerative braking.

By steps 404 and 405, the over rotation limitation control is performed such that the difference between the rotation speeds of the ring gear RG coupled to the wheel 14 side and the carrier C coupled to the engine 11 side is limited within the allowable range and the pinion gear rotation speed is maintained to be lower than the limit value.

If it is determined at step 403 that the vehicle travel speed is lower than the predetermined value, it is determined that the pinion gear rotation speed will not exceed the limit value. In this case, this routine ends without performing the over rotation limitation control by steps 404 and 405.

Figure 11:
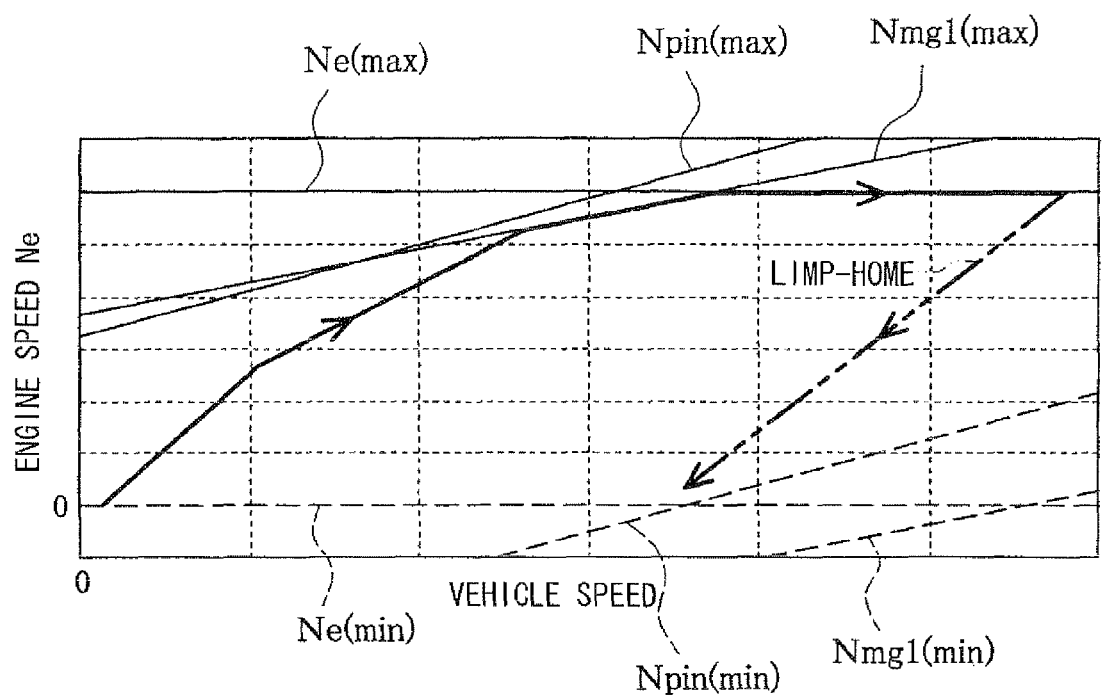
FIG. 11 is a graph showing advantageous effects of the second embodiment.

According to the second embodiment, when the vehicle operation mode is changed to the limp-home travel mode in response to the occurrence of abnormality in the first inverter 22, the over rotation limitation control is performed to control the vehicle travel speed such that the pinion gear rotation speed Npin does not exceed the limit value as shown in FIG. 11. As a result, the difference between the rotation speeds of the ring gear RG coupled to the wheel 14 side and the carrier C coupled to the engine 11 side can be limited to be within the allowable range and the pinion gear rotation speed can be maintained to be lower than the limit value. Thus, substantially the same advantage can be provided as in the first embodiment.

According to the second embodiment, the vehicle travel speed can be lowered surely since the vehicle travel speed is lowered by the brake device provided in the vehicle in performing the over rotation limitation control. In addition, the vehicle travel speed is lowered by the regenerative braking, in which the kinetic energy of the vehicle is converted into the electric power by the second MG 13 an restored to the battery 21 in the over rotation limitation control. As a result, by increasing the amount of charging the battery 21 by the regenerative braking, the amount of electric power, which can be supplied from the battery 21 to the second MG 13, can be increased. With this increased electric power, the vehicle can travel more distance in the limp-home travel mode, in which the vehicle is driven to travel by the drive power of the second MG 13. It is of course possible to lower the vehicle travel speed by only one of the brake device and the regenerative braking in the over rotation limitation control.

According to the second embodiment, when the vehicle operation mode is changed to the limp-home travel mode because of occurrence of abnormality in the first inverter 22, the over rotation limitation control is performed to lower the vehicle travel speed so that the pinion gear rotation speed will not exceed the limit value. However, the over rotation limitation control is not limited to such control. For example, in case of a system, in which the first MG 12 and the planetary gear set 16 are replaceable with new ones individually, the over rotation limitation control may be performed to lower the vehicle travel speed so that the pinion rotation speed will not exceed the limit value when the vehicle operation mode is changed to the limp-home travel mode due to occurrence of abnormality in the first MG 12 system (for example, first MG 12 and first inverter 22).

Further, it is also possible to perform the over rotation limitation control to lower the vehicle speed so that the pinion rotation speed will not exceed the limit value when the vehicle operation mode is changed to the limp-home travel mode due to occurrence of abnormality in the engine 11 system (for example, fuel system, air system or ignition system).

In addition, it is possible to combine the first embodiment and the second embodiment. In this case, when the vehicle operation mode is changed to the limp-home travel mode due to occurrence of abnormality in the first inverter 22, the engine rotation speed is controlled so that the pinion gear rotation speed will not exceed the limit value.

Alternatively, it is also possible to perform the over rotation limitation control to control the engine rotation speed and further lower the vehicle travel speed so that the pinion rotation speed will not exceed the limit value, when the vehicle operation mode is changed to the limp-home travel mode due to occurrence of abnormality in the first MG 12 system (for example, first MG 12 and first inverter 22).

What is claimed is:

1. A control apparatus for a vehicle drive system, in which an internal combustion engine is coupled to a pinion gear of a planetary gear set through a carrier, a first motor generator is coupled to sun gear of the planetary gear set and a wheel drive shaft is coupled to a ring gear of the planetary gear set and a second motor generator is coupled to the wheel drive shaft, the control apparatus comprising:
   a limp-home travel control section configured to change a vehicle operation mode to a limp-home travel mode, in which a vehicle is driven by only drive power of the second motor generator, when a predetermined abnormality occurs; and
   an over rotation limitation control section configured to perform, when the vehicle operation mode is changed to the limp-home travel mode due to occurrence of abnormality in a system of the first motor generator, an over rotation limitation control to control a rotation speed of the internal combustion engine so that a difference between a rotation speed of the carrier and a rotation speed of the ring gear is limited to be within a predetermined range and a rotation speed of the pinion gear is limited to be lower than a predetermined limit value.

2. The control apparatus for a vehicle drive system according to claim 1, wherein the over rotation control limitation control section is further configured to set a target rotation speed of the internal combustion engine in accordance with a travel speed of the vehicle in performing the over rotation limitation control.

3. The control apparatus for a vehicle drive system according to claim 1, wherein the over rotation limitation control section is further configured to perform the over rotation limitation control only when the travel speed of the vehicle is higher than a predetermined value.

4. The control apparatus for a vehicle drive system according to claim 1, wherein:
   at least the first motor generator and the planetary gear set are integrated unitarily into a transfer assembly unit; and
   the over rotation limitation control section is further configured to perform the over rotation limitation control when the vehicle operation mode is changed to the limp-home travel mode due to occurrence of abnormality in an inverter for the first motor generator.

5. A control apparatus for a vehicle drive system, in which an internal combustion engine is coupled to a pinion gear of a planetary gear set through a carrier, a first motor generator is coupled to sun gear of the planetary gear set and a wheel drive shaft is coupled to a ring gear of the planetary gear set and a second motor generator is coupled to the wheel drive shaft, the control apparatus comprising:
   a limp-home travel control section configured to change a vehicle operation mode to a limp-home travel mode, in which a vehicle is driven by drive power of the second motor generator, when a predetermined abnormality occurs; and
   an over rotation limitation control section configured to perform, when the vehicle operation mode is changed to the limp-home travel mode, an over rotation limitation control to lower a travel speed of the vehicle so that a difference between a rotation speed of the carrier and a rotation speed of the ring gear is limited to be within a predetermined range and a rotation speed of the pinion gear is limited to be lower than a predetermined limit value.

6. The control apparatus for a vehicle drive system according to claim 5, wherein the over rotation limitation control section is further configured to lower the travel speed of the vehicle in performing the over rotation limitation control by a brake device provided in the vehicle.

7. The control apparatus for a vehicle drive system according to claim 5, wherein the over rotation limitation control section is further configured to lower the travel speed of the vehicle in performing the over rotation limitation control by a regenerative braking, in which kinetic energy of the vehicle is converted into electric power by the second MG and the electric power is restored to a battery.

8. The control apparatus for a vehicle drive system according to claim 5, wherein the over rotation limitation control section is further configured to perform the over rotation limitation control only when the travel speed of the vehicle is higher than a predetermined value.

9. The control apparatus for a vehicle drive system according to claim 5, wherein:
   at least the first motor generator and the planetary gear set are integrated unitarily into a transfer assembly unit; and
   the over rotation limitation control section is further configured to perform the over rotation limitation control when the vehicle operation mode is changed to the limp-home travel mode due to occurrence of abnormality in an inverter for the first motor generator.

* * * * *